(12) United States Patent
Bloecker (10) Patent No.: US 12,349,259 B2
(45) Date of Patent: Jul. 1, 2025

(54) SYSTEMS AND METHODS FOR CONTROLLING ILLUMINATION OF CENTER CAPS IN VEHICLE WHEELS

(71) Applicant: GM GLOBAL TECHNOLOGY OPERATIONS LLC, Detroit, MI (US)

(72) Inventor: Stanley R. Bloecker, Bruce, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 168 days.

(21) Appl. No.: 18/330,520

(22) Filed: Jun. 7, 2023

(65) Prior Publication Data
US 2024/0414828 A1    Dec. 12, 2024

(51) Int. Cl.
| | |
|---|---|
| H05B 47/19 | (2020.01) |
| B60B 7/00 | (2006.01) |
| B60B 7/04 | (2006.01) |
| B60B 7/20 | (2006.01) |
| B60Q 1/50 | (2006.01) |
| B60R 13/00 | (2006.01) |
| F21S 43/20 | (2018.01) |
| F21Y 115/10 | (2016.01) |

(52) U.S. Cl.
CPC ............ *H05B 47/19* (2020.01); *B60B 7/006* (2013.01); *B60B 7/04* (2013.01); *B60B 7/20* (2013.01); *B60Q 1/543* (2022.05); *F21S 43/26* (2018.01); *B60R 13/005* (2013.01); *F21Y 2115/10* (2016.08)

(58) Field of Classification Search
CPC ............ B60B 7/0013–20; B60Q 1/326; B60Q 1/54–549; B60R 13/005; F21Y 2115/10
See application file for complete search history.

(56) References Cited

U.S. PATENT DOCUMENTS

| | | | |
|---|---|---|---|
| 7,354,182 B2 * | 4/2008 | Bartels | B60Q 1/326 362/500 |
| 9,845,045 B2 * | 12/2017 | Fisher | B60B 7/006 |
| 10,710,400 B2 * | 7/2020 | Li | G09F 21/045 |
| 2005/0146204 A1 * | 7/2005 | Kim | B60B 7/14 301/37.25 |

* cited by examiner

*Primary Examiner* — Jason M Han (57) ABSTRACT

A system includes a wheel including a center cap having a first portion configured to rotate with the wheel and a second portion configured to remain stationary. The second portion includes a light source and a power storage module. The system further includes a generator configured to generate power and output the power to at least the power storage module, a power converter coupled between the power storage module and the light source, and a control module. The control module is configured to receive a signal indicative of a key associated with the vehicle being within a defined distance, and in response to receiving the signal, control the power converter to output the power generated by the generator and stored in the power storage module to the light source. Other examples systems and methods for controlling a light source in a wheel of a vehicle are also disclosed.

20 Claims, 5 Drawing Sheets

SYSTEMS AND METHODS FOR CONTROLLING ILLUMINATION OF CENTER CAPS IN VEHICLE WHEELS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for controlling illumination of center caps in vehicle wheels, and more particularly to controlling light sources for illuminating stationary emblems in the center caps of vehicle wheels and powering the light sources with generated electric power.

Vehicles include tires and wheels positioned within the tires. Each wheel typically includes a rim and a center cap positioned in a center of the rim. The center cap generally covers fasteners (e.g., bolts, nuts, etc.) attaching the wheel to a hub assembly of the vehicle, and may include an emblem (e.g., a logo, etc.) associated with the vehicle. In some vehicles, the entire wheel may rotate along with its associated tire as the vehicle moves. In other vehicles, a portion of the wheel may rotate while another portion of the wheel remains stationary. For example, the rim may rotate or remain stationary while the center cap remains stationary or rotates.

SUMMARY

A system for controlling at least one light source in a wheel of a vehicle includes a wheel including a center cap having a first portion configured to rotate with the wheel and a second portion configured to remain stationary as the wheel rotates. The second portion includes at least one light source and a power storage module. The system further includes a generator coupled to the power storage module and configured to generate electric power and output the electric power to at least the power storage module, a power converter coupled between the power storage module and the at least one light source, and a control module in communication with the power converter. The control module is configured to receive a signal indicative of a key associated with the vehicle being within a defined distance, and in response to receiving the signal, control the power converter to output the electric power generated by the generator and stored in the power storage module to the at least one light source.

In other features, the control module is configured to control the at least one light source to output a defined light sequence based on the received signal.

In other features, the signal is a first signal and the defined light sequence is a first defined light sequence, and the control module is configured to receive a second signal indicative of a message relating to a characteristic of the vehicle and control the at least one light source to output a second defined light sequence based on the second signal.

In other features, the first portion of the center cap includes a housing and a shaft coupled to the housing, and the light source and the power storage module are positioned within the housing.

In other features, the second portion of the center cap includes an emblem associated with the vehicle, and the control module is configured to control the light source to illuminate the emblem.

In other features, the housing includes a body and a transparent face attached to the body, and the transparent face is positioned adjacent to the emblem.

In other features, the at least one light source includes one or more LEDs.

In other features, the generator includes at least one magnet coupled to a rotating component of the first portion and at least one coil coupled to a stationary component of the second portion.

In other features, the power storage module includes a battery and/or an ultra-capacitor.

In other features, the control module includes a communications module in communication with a virtual key module associated with the vehicle, and the communications module is configured to receive the signal via the virtual key module.

A method of controlling at least one light source in a wheel of a vehicle id disclosed. The wheel includes a center cap having a first portion configured to rotate with the wheel and a second portion configured to remain stationary as the wheel rotates. The second portion includes the light source and a power storage module. The method includes receiving a signal indicative of a key associated with the vehicle being within a defined distance, and in response to receiving the signal, controlling a power converter to output electric power generated by a generator and stored in the power storage module to the light source.

In other features, the method further includes controlling the light source to output a defined light sequence based on the received signal.

In other features, the signal is a first signal and the defined light sequence is a first defined light sequence, and the method further includes receiving a second signal indicative of a message relating to a characteristic of the vehicle, and controlling the light source to output a second defined light sequence based on the second signal.

In other features, the first portion of the center cap includes a housing and a shaft coupled to the housing, and the light source and the power storage module are positioned within the housing.

In other features, the second portion of the center cap includes an emblem associated with the vehicle, and controlling the light source to output the defined light sequence includes controlling the light source to illuminate the emblem.

In other features, the housing includes a body and a transparent face attached to the body, and the transparent face is positioned adjacent to the emblem.

In other features, the generator includes at least one magnet coupled to a rotating component of the first portion and at least one coil coupled to a stationary component of the second portion.

In other features, the power storage module includes a battery and/or an ultra-capacitor.

A system for controlling at least one light source in a wheel of a vehicle is disclosed. The system includes a wheel having a center cap with a first portion configured to rotate with the wheel and a second portion configured to remain stationary as the wheel rotates. The second portion includes at least one light source and a battery. The system further includes a generator configured to generate electric power and output the electric power to at least the battery, a power converter coupled between the battery and the at least one light source, and a control module. The generator includes at least one magnet coupled to a rotating component of the first portion and at least one coil coupled to a stationary component of the second portion. The control module is configured to receive a signal indicative of a key associated with the vehicle being within a defined distance, control the power converter to provide the electric power generated by the generator and stored in the battery to the at least one light source in response to receiving the signal, and control the at least one light source to output a defined light sequence based on the received signal.

In other features, the signal is a first signal and the defined light sequence is a first defined light sequence, and the control module is configured to receive a second signal indicative of a message relating to a characteristic of the vehicle and control the at least one light source to output a second defined light sequence based on the second signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicle wheels include a center cap with an emblem (e.g., a logo, etc.) for identifying, for example, a manufacturer of the vehicle, an interest of the vehicle owner, etc. In some examples, the wheels include a portion that rotates and another portion that remains stationary while the vehicle moves. For example, a rotating portion of the center cap may rotate with the vehicle tires while a stationary portion (e.g., the emblem, etc.) of the center cap may remain stationary as the vehicle moves. In some instances, it may be desirable to illuminate the emblem before the vehicle begins moving, while the vehicle is moving, and/or after the vehicle comes to a stop.

System and methods according to the present disclosure includes solutions for illuminating emblems and/or other desired portions of center caps. Such illumination may be accomplished with light sources powered by electric power generated at or near a wheel through, for example, movement of the vehicle. For example, a vehicle system may include a wheel having a center cap with a light source and a power storage module (e.g., a battery, etc.), a power generator that generates and outputs electric power to at least the power storage module, a power converter coupled between the power storage module and the light source, and a control module that receives a signal (e.g., indicative of a key associated with the vehicle being within a defined distance, a message relating to a characteristic of the vehicle, etc.), and then controls the power converter to output the electric power generated by the power generator and stored in the power storage module to the light source. In this manner, power generated and stored on the vehicle may be used to illuminate the light source according to, for example, multiple different light sequences.

Figure 1:
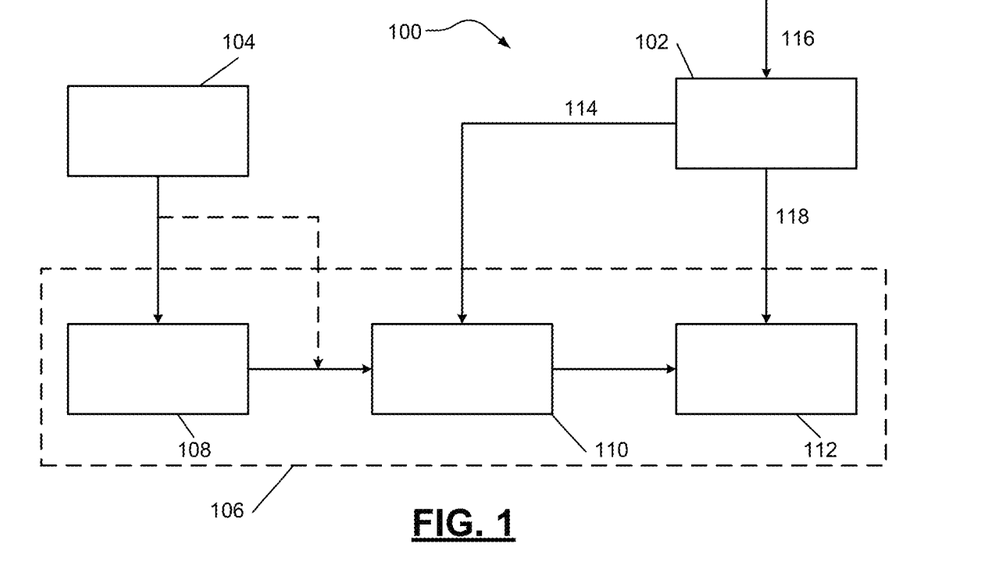
FIG. 1 is a functional block diagram of an example vehicle system including a power generator for generating electrical power and a control module for controlling illumination of a center cap in a vehicle wheel according to the present disclosure.

Referring now to FIG. 1, a functional block diagram of an example vehicle system 100 is presented. The vehicle system 100 may be for any suitable vehicle having wheels with center caps, such as an electric vehicle (e.g., a pure electric vehicle, a plug-in hybrid electric vehicle, etc.), an internal combustion engine vehicle, etc. Additionally, the vehicle system may be applicable to an autonomous vehicle, a semi-autonomous vehicle, or a non-autonomous vehicle.

As shown in FIG. 1, the vehicle system 100 generally includes a control module 102, a power generator 104, and a center cap 106 for a wheel. The center cap 106 includes a power storage module 108, a power converter module 110, and a light source 112. While the vehicle system 100 of FIG. 1 is shown and described herein as having one center cap 106 associated with one wheel of the vehicle, it should be appreciated that the vehicle system 100 may include multiple wheels (e.g., two wheels, four wheels, etc.) each having a center cap with similar features as the center cap 106. Additionally, while the vehicle system 100 is shown and described herein as having one power storage module and one light source, it should be appreciated that the vehicle system 100 may include multiple power storage modules and/or multiple light sources if desired.

In the example of FIG. 1, the center cap 106 is generally positioned in a center portion of the wheel. In such examples, the center cap 106 may cover fasteners (e.g., bolts, nuts, etc.) attaching the wheel to a hub assembly of the vehicle.

The center cap 106 may include a rotating portion and a stationary portion. The rotating portion of the center cap 106 rotates with the wheel as the vehicle moves, and the stationary portion of the center cap 106 remains stationary (e.g., static, etc.) as the wheel rotates and the vehicle moves. In some examples, the stationary portion of the center cap 106 may include the power storage module 108, the power converter module 110, the light source 112, one or more emblems (e.g., logos, etc.), and/or components (e.g., circuit boards, light guides, etc.) associated with the power storage module 108, the power converter module 110, and/or the light source 112. The rotating portion of the center cap 106 may include, for example, a housing and a shaft for attaching the center cap 106 (e.g., the housing of the center cap 106) to the wheel (e.g., the rim of the wheel). In this manner, while a portion of the center cap 106 may rotate, another portion (e.g., an emblem) stays level to the world and floats while the vehicle moves thereby providing a dynamic center cap.

The stationary portion of the center cap 106 may be held static in various manners. For example, the center cap 106 may include a weight that generally attaches to the stationary portion directly and/or indirectly through other intervening components (e.g., boards, brackets, etc.). In such examples, the weight may be sized to ensure the stationary portion (e.g., the emblem) remains static as the vehicle moves. Alternatively, the stationary portion of the center cap 106 may be held static by attaching the stationary portion to a stationary knuckle of the vehicle's suspension. In still other examples, the stationary portion of the center cap 106 may be held static by employing a gyroscope and a controllable drive motor, or a gyroscope and a controllable fluid drive.

As shown in FIG. 1, the power generator 104 is coupled to the power storage module 108 of the center cap 106 for providing power to the power storage module 108. For example, the power generator 104 generates electric power and outputs the generated power to the power storage module 108. In such examples, the power storage module 108 may store the electric power for later use in the system 100. In various embodiments, the power generator 104 may additionally (or alternatively) output the generated power to the power converter module 110 as shown in FIG. 1.

Electrical power may be generated by the power generator 104 in various manners. For example, the power generator 104 may include one or more magnets coupled to a rotating component of the center cap 106 and one or more coils coupled to a stationary component of the center cap 106. For instance, magnets may be coupled to the rotating housing of the center cap 106, the rotating shaft of the center cap 106, etc., and coils may be coupled to a stationary board (e.g., a substrate) near the rotating housing, the rotating shaft, etc. With this configuration, the magnets may rotate around the coils to create electrical current (e.g., similar to a stator).

In other examples, the power generator 104 may rely on air movement to generate electrical power. For example, the power generator 104 may include a wind fan in the wheel that rotates due to air passing through the wheel (e.g., from the outside of the wheel to the inside of the wheel) as the vehicle moves. This rotation of the fan (e.g., blades of the fan) may be used to cause magnets to rotate around coils, thereby creating electrical current. In still other examples, the power generator 104 may include one or more solar panels coupled near the wheel or in another location on the vehicle for generating power. In yet other examples, the power generator 104 may include one or more springs and an oscillating weight (e.g., a rotor) to create electrical current through rotation of the wheel. Alternatively, the power generator 104 may include a resonator in the hub assembly, in a fender, etc. of the vehicle, a wireless charger the hub assembly, a thermocouple coupled near a heating generating component (e.g., a brake rotor, etc.), an electrified rotor and a drag wire, and/or other suitable manners for creating and/or otherwise supplying electrical current.

In the example of FIG. 1, the power storage module 108 is coupled to the power generator 104 for receiving and storing power from the power generator 104. In such examples, the power storage module 108 may be any suitable component(s) for storing electrical power. For example, the power storage module 108 may include one or more batteries (e.g., rechargeable batteries), ultra-capacitors, Tesla coils, static electricity holders, etc. In various embodiments, the power storage module 108 may be stationary and positioned in the rotating housing, as explained above.

With continued reference to FIG. 1, the power converter module 110 is coupled to provide power to the light source 112 for illuminating the light source 112. For example, and as shown in FIG. 1, the power converter module 110 is coupled between the power storage module 108 and/or the power generator 104 and the light source 112. In such examples, the power converter module 110 may receive an input (e.g., a regulated or unregulated input) from the power storage module 108 and/or the power generator 104, and then convert the received input into a regulated output for the light source 112 (e.g., one or more LEDs, etc.). In various embodiments, the power converter module 110 may include an optional (internal) control module in communication with the control module 102, a power converter (e.g., a boost power converter, a buck converter, etc.) for providing the regulated output to the light source 112, etc.

The control module 102 of FIG. 1 is in communication with the power converter module 110. More specifically, the control module 102 may generate and transmit a signal 114 (e.g., a control signal) to the power converter module 110 for controlling the power converter module 110. For example, the control module 102 may receive an input signal 116. In some examples, the input signal 116 may be indicative of a key associated with the vehicle being within a defined distance. For instance, a physical key fob in the possession of a user, a key stored on a smartphone, etc. may be detected by a key computing module (e.g., a virtual key module and/or another suitable module that detects key proximity to the vehicle) in the vehicle when the key fob, the smartphone, etc. is within a defined distance (e.g., ten meters, etc.). Then, the key computing module may provide the input signal 116 to the control module 102 indicating the key fob, the smartphone, etc. is nearby. In such examples, the key computing module may detect the key fob, the smartphone, etc. and/or provide the input signal 116 to the control module 102 via low-energy, wireless communication, such as Bluetooth communication. In response to receiving the signal 116, the control module 102 may then control the power converter module 110 (via the output signal 114) to output the electric power generated by the generator 104 and/or stored in the power storage module 108 to the light source 112. As such, the light source 112 is activated (e.g., turns on) to illuminate the center cap 106.

In some examples, the control module 102 may control the light source 112 to output a defined light sequence. For example, the control module 102 may generate and transmit a signal 118 (e.g., a control signal) to the light source 112 for generating the light sequence. In other examples, the control module 102 may control the light source 112 through the signal 114 provided to the power converter module 110. In either case, the control module 102 may control the light source 112 to output the defined light sequence based on the received signal 116. For example, when the control module 102 receives the input signal 116 indicating the key fob, the smartphone, etc. is nearby, the control module 102 may generate and transmit the signal 118 to the light source 112 to control the light source according to a defined walk-up light sequence. For instance, the light source 112 (e.g., one or more LEDs) may flash periodically in a defined pattern, change colors in a defined pattern, etc.

In other examples, the control module 102 may receive the input signal 116 indicating the key fob, the smartphone, etc. is detected but outside a defined distance. This may signify that the user in possession of the key fob, the smart phone, etc. is walking away from the vehicle. In such examples, the control module 102 may generate and transmit the signal 118 to the light source 112 to control the light source according to another defined light sequence (e.g., a walk-away light sequence).

In still other examples, the control module 102 may generate and transmit the signal 118 to the light source 112 and/or the signal 114 to the power converter module 110 for generating yet another defined light sequence. For example, the control module 102 may receive the input signal 116 and/or another signal indicative of a message relating to a characteristic of the vehicle. In such examples, the control module 102 may receive the signal 116 from the key computing module, an engine control module (ECM) and/or one or more sensors in the vehicle. For instance, the signal may signify a vehicle maintenance recommendation (e.g., an oil change, a tire rotation, etc.), a vehicle condition (e.g., one of the tires has low air pressure, engine oil is low, etc.). Then, based on the received signal, the control module 102 may control the light source 112 to output a defined light sequence to notify an approaching user of the message. For example, the light source 112 may flash a particular color for one vehicle maintenance recommendation, flash another color for another vehicle maintenance recommendation, flash in a particular pattern for one vehicle condition, flash in another pattern for another vehicle condition, etc.

Figure 2:
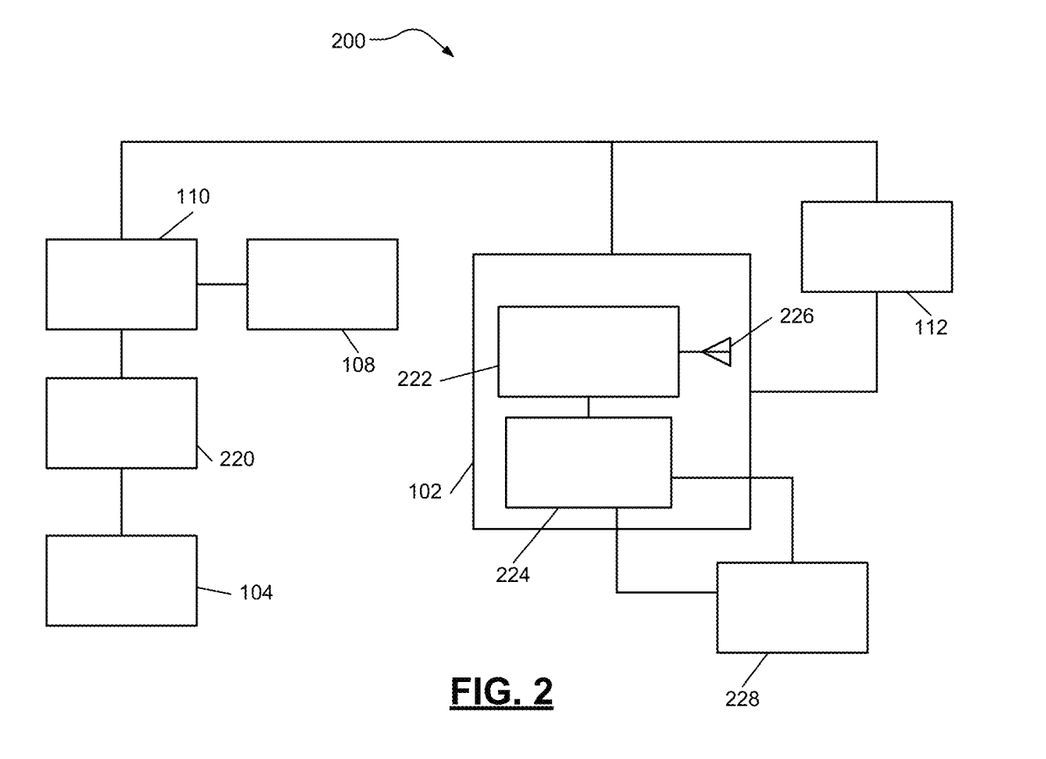
FIG. 2 is a functional block diagram of another example vehicle system for generating electrical power and controlling illumination of a center cap in a vehicle wheel according to the present disclosure.

FIG. 2 depicts another example vehicle system 200 employable in any suitable vehicle having wheels with center caps. The vehicle system 200 of FIG. 2 is substantially similar to the vehicle system 100 of FIG. 1. For example, the vehicle system 200 includes the control module 102, the power generator 104, the power storage module 108, the power converter module 110, and the light source 112 of FIG. 1, all of which function in a similar manner as explained above. In the example of FIG. 2, the power storage module 108 includes one or more batteries, and the light source 112 includes one or more LED(s). While the light source 112 of FIG. 2 is described as including one or more LED(s), it should be appreciated that the light source 112 may include other suitable components (in addition to or alternative to the LEDs) for providing light, such as one or more mirrors, blacklight glow, luminescence, etc.

As shown in FIG. 2, the vehicle system 200 further includes a voltage regulator 220 coupled between the power generator 104 and the power converter module 110. In such examples, the voltage regulator 220 regulates a voltage associated with the power generated by the power generator 104, and then provides the regulated voltage to the power converter module 110. Then, the power converter module 110 may convert (if necessary) the received regulated voltage into a different voltage for the battery and/or the LEDs.

Additionally, the control module 102 of FIG. 2 is shown as including a communications module 222 and a controller 224 coupled to the communications module 222. In such examples, the communications module 222 may be a Bluetooth communications module (e.g., a Bluetooth chip) or another suitable low-energy, wireless communications module in communication with a key computing module (e.g., a virtual key module), as explained herein. For example, and as shown in FIG. 2, the communications module 222 may be in communication with the key computing module via an antenna 226. In such examples, the communications module 222 may receive one or more input signals (e.g., the input signal 116 of FIG. 1), and the controller 224 (e.g., a microcontroller, etc.) may generate one or more output signals (e.g., the signal 114 and/or the signal 118 of FIG. 1) based on the received input signals, as explained herein.

As shown in FIG. 2, the controller 224 of the control module 102 is coupled to a switching device 228. For example, the switching device 228 may be a hall switch or another suitable switch. In such examples, the switching device 228 may be controlled to couple a magnet as desired. For instance, when the switching device 228 is closed, the magnet may be used to put a particular center cap of the vehicle in a pairing mode so that the vehicle (e.g., the control module 102) can find and link to that specific center cap and not other center caps in the area. When the switching device 228 is open, the magnet may be disconnected causing the center cap to exit its pairing mode. With such configurations, each center cap of the vehicle may be assigned (e.g., by the control module 102, based on user input, etc.) a defined location, such as driver front, passenger rear, etc. In this way, the control module 102 may control the light source 112 of one or more particular center caps (at specific wheels, locations, etc.) to output a defined light sequence, as explained above.

Figure 3:
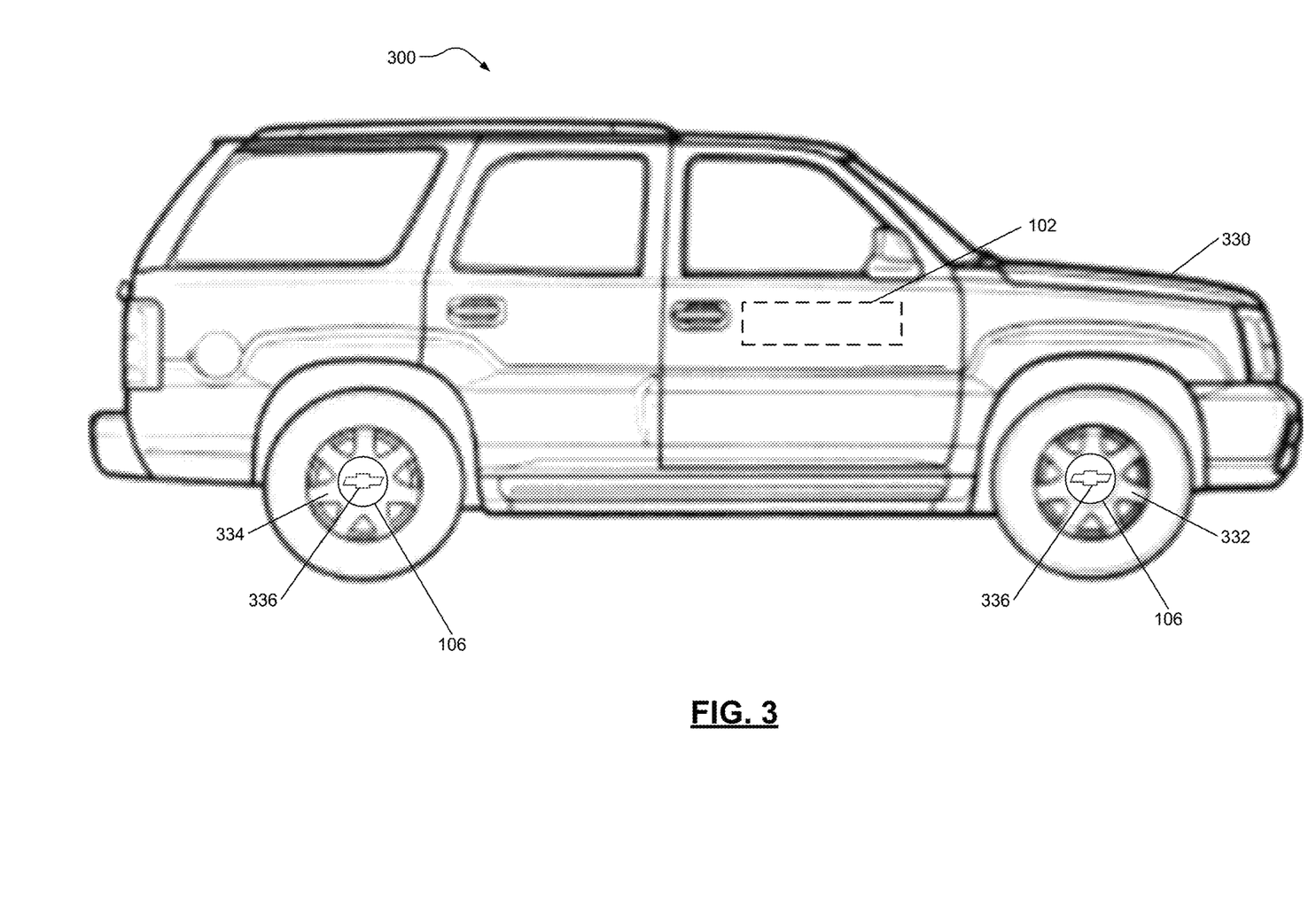
FIG. 3 is a functional block diagram of a vehicle including portions of the system of FIG. 1 according to the present disclosure.

In various embodiments, the vehicle system 100 of FIG. 1, the vehicle system 200 of FIG. 2, and/or portions thereof may be implemented in any suitable vehicle. For example, FIG. 3 depicts a side view of an example vehicle 300 including a body 330 arranged on a frame, wheels 332, 334 coupled to the frame, and a portion of the vehicle system 100 of FIG. 1. More specifically, the vehicle 300 is shown as including the control module 102 and two of the center caps 106 of FIG. 1. One of the center caps 106 is coupled to the front wheel 332, and the other center cap 106 is coupled to the rear wheel 332. As shown in FIG. 3, each center cap 106 includes an emblem 336 associated with the vehicle 300 (e.g., a manufacturer of the vehicle). In such examples, the emblem 336 in each center cap 106 may remain static when the vehicle 300 moves and be illuminated via a light source (e.g., the light source 112 of FIG. 1), as explained herein. Additionally, although not shown, the vehicle 300 includes two wheels each having the center cap 106 of FIG. 1 on the opposing side of the vehicle 300.

Figure 4:
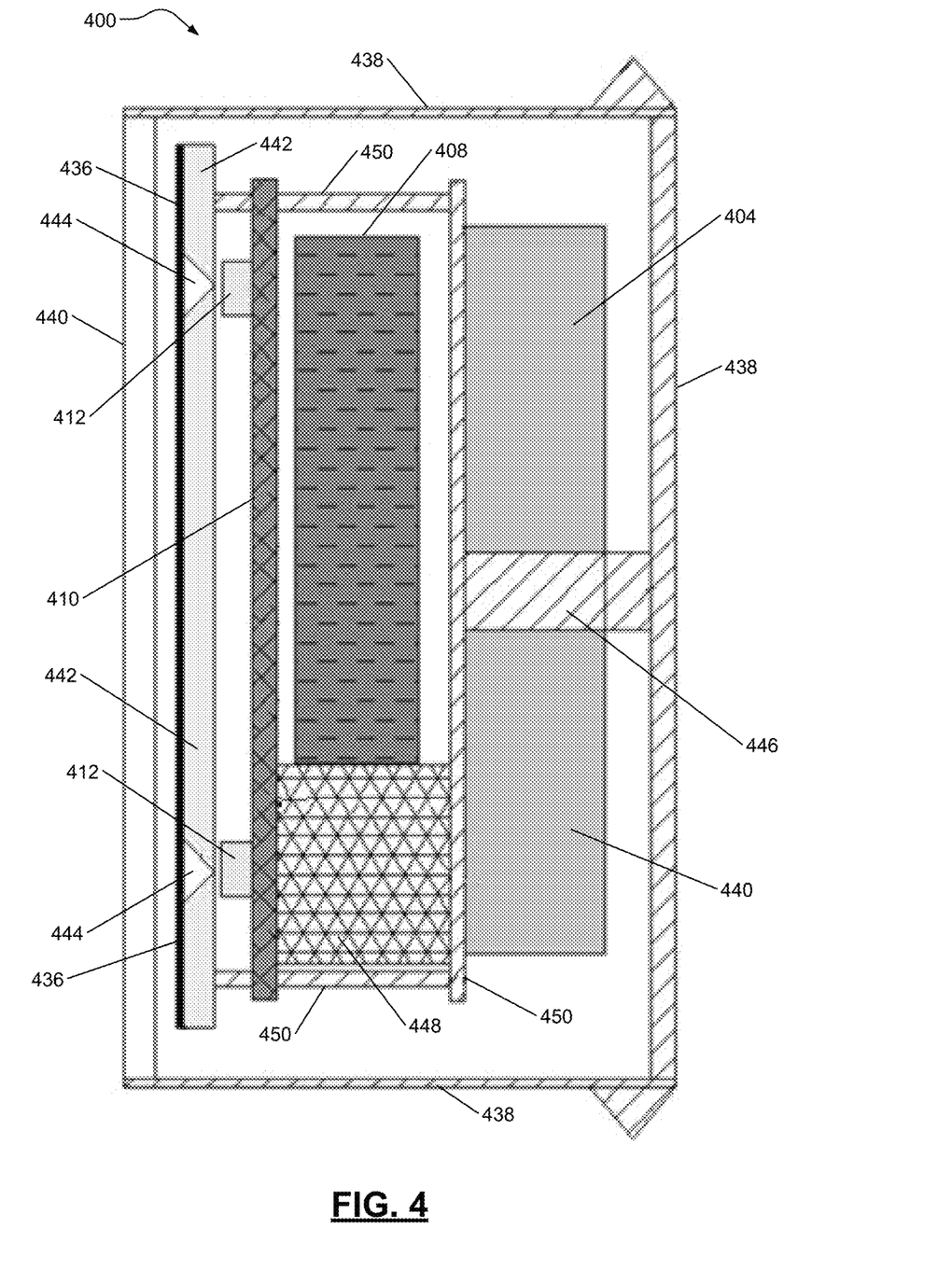
FIG. 4 is a cross-sectional side view of an example center cap employable in the system of FIG. 1 or 2 according to the present disclosure.
Figure 5:
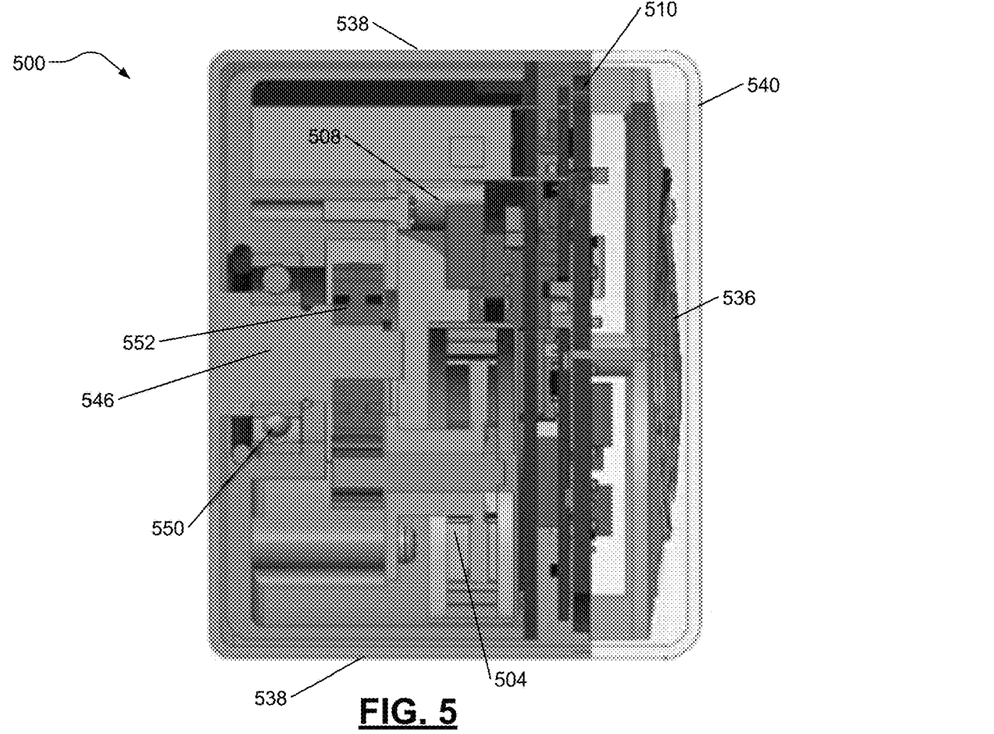
FIG. 5 is a side view of another example center cap employable in the system of FIG. 1 or 2 according to the present disclosure.
Figure 6:
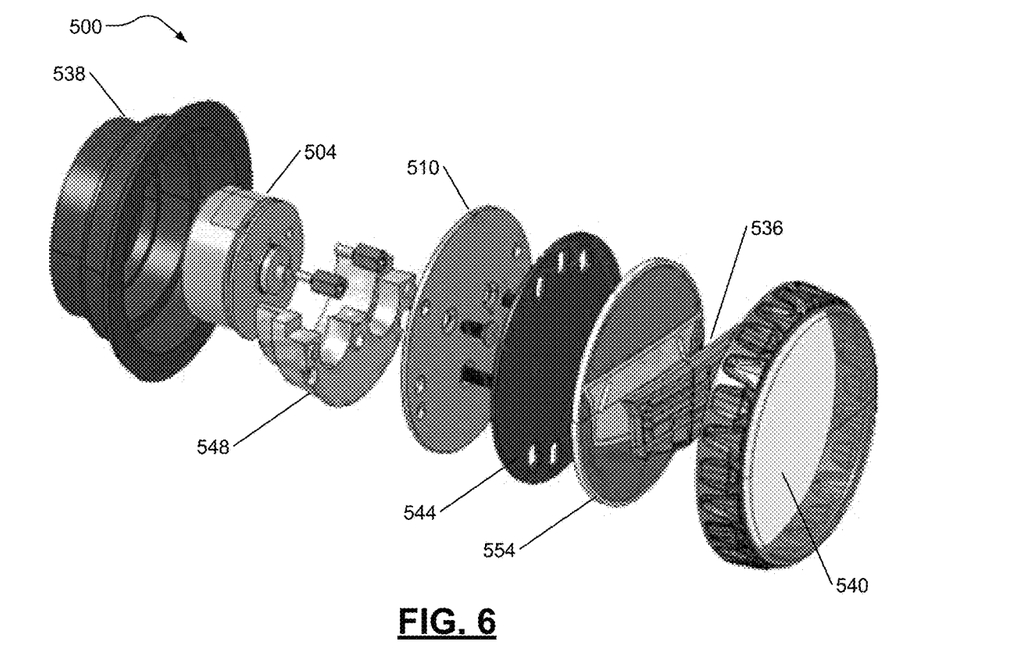
FIG. 6 is an exploded isometric view of the center cap of FIG. 5 according to the present disclosure.

FIGS. 4-6 illustrate example center caps 400, 500 employable in the systems 100, 200 of FIGS. 1-2. For example, the center cap 400 of FIG. 4 includes a housing with various components positioned within the housing. Specifically, the housing includes a body 438 and a face 440 coupled to the body 438. In such examples, the face 440 may be formed of an entirely transparent or a semi-transparent material. Within the housing, the center cap 400 includes an emblem 436 positioned adjacent to the face 440 and a light guide assembly positioned adjacent to and on an opposing side of the emblem 436. In the example of FIG. 4, the light guide assembly includes a lens 442 (e.g., a light distribution substrate) and light guides 444 positioned within the lens 442. The center cap 400 further includes a circuit board 410 for supporting a control module (e.g., the control module 102 of FIG. 1 or 2) and LEDs 412 that illuminate the emblem 436 via the light guide assembly, as explained herein. Additionally, adjacent to the circuit board 410, the center cap 400 includes a battery 408 (e.g., a LiFePO battery, etc.), a stabilizing ballast/weight 448, a power generator assembly 404, and a rotating generator shaft 446 coupled to the body 438 of the housing. Brackets 450 may be employed to secure various stationary components (e.g., the power generator assembly 404, the battery 408, the circuit board 410, the light guide assembly, the emblem 436, etc.) to the stabilizing weight 448. In such configurations, the housing (including its body 438 and face 440) and the generator shaft 446 may rotate with the wheel (as the vehicle moves) while the remaining components may remain stationary due to the stabilizing weight 448.

In FIGS. 5-6, the center cap 500 includes similar components as the center cap 400 of FIG. 4. For example, the center cap 500 includes a housing having a body 538 and a face 540 coupled to the body 538. The face 540 may be formed at least partially of an entirely transparent or a semi-transparent material. The center cap 500 further includes an emblem 536 positioned on a base 554 and adjacent to the face 540, a light guide assembly 544 positioned adjacent to and on an opposing side of the emblem 536, and a circuit board 510 for supporting a control module (e.g., the control module 102 of FIG. 1 or 2) and LEDs. Adjacent to the circuit board 510, the center cap 500 includes one or more ultra-capacitors 508 for storing electrically power, a stabilizing ballast/weight 548, and a power generator assembly 504. Additionally, the center cap 500 includes a rotating generator shaft 546 coupled to the body 538 of the housing, and gears 552 and ball bearings 550 for effectively rotating the housing as the vehicle moves.

In various embodiments, the center caps 400, 500 of FIGS. 4-6 may form an enclosure for isolating the components therein from the environment. For example, the bodies 438, 538 and the faces 440, 540 of FIGS. 4-6 may form seals therebetween to encapsulate the moving components and the electronic components within the center caps 400, 500. In such examples, moisture, dust, and/or other undesirable materials may be prevented entering the center caps 400, 500.

Figure 7:
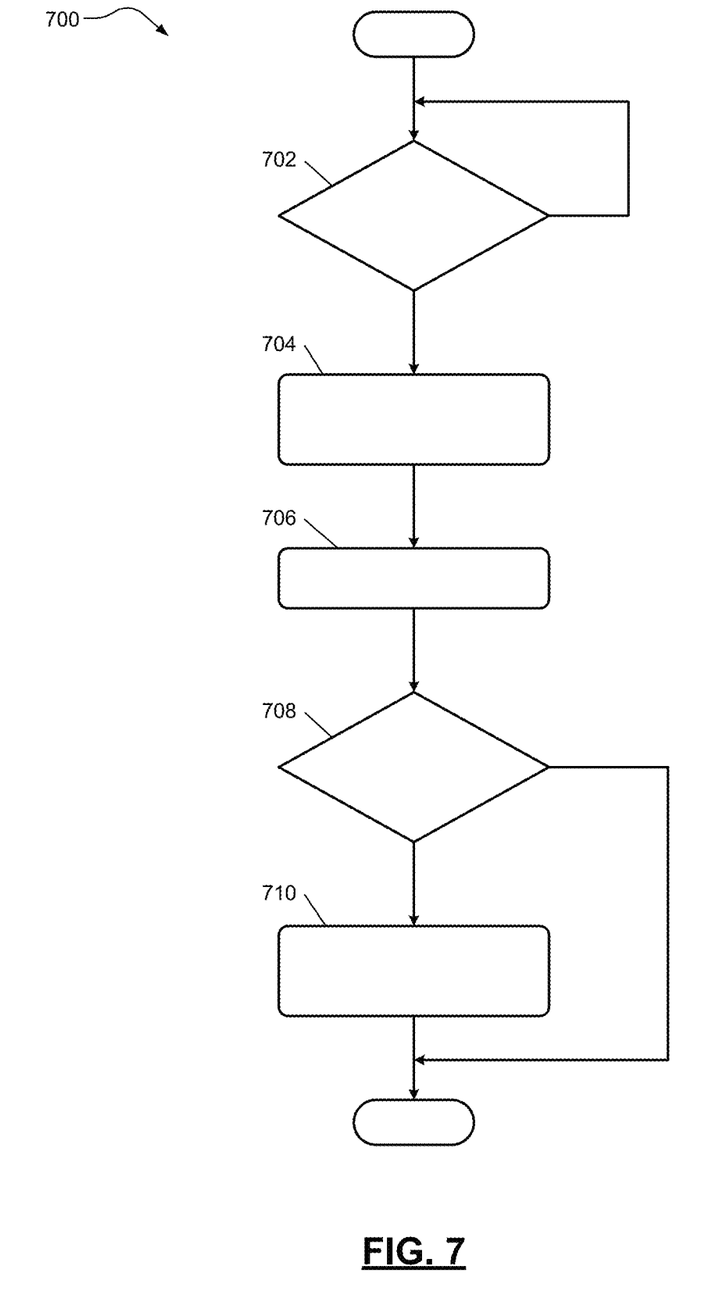
FIG. 7 is a flowchart of an example control process for controlling illumination of a center cap in a vehicle wheel according to the present disclosure.

FIG. 7 illustrates an example control process 700 employable by the vehicle system 100 of FIG. 1 for controlling the light source 112 in a vehicle wheel. Although the example control process 700 is described in relation to the system 100 of FIG. 1 including the control module 102, the control process 700 may be employable by another suitable system, such as the system 200 of FIG. 2. The control process 700 may start when the system is powered-on and/or at another suitable time.

As shown in FIG. 7, control begins at 702 where the control module 102 determines whether a key signal is received. For example, the control module 102 may receive a signal indicative of a key associated with the vehicle being within a defined distance (e.g., ten meters, etc.). In such examples, a physical key fob in the possession of a user, a key stored on a smartphone, etc. may be detected by a key computing module (e.g., a virtual key module) in the vehicle when the key fob, the smartphone, etc. is within the defined distance. Then, the key computing module may provide the signal to the control module 102 indicating the key fob, the smartphone, etc. is nearby. If no signal is received, control returns to 702. If, however, a signal is received, control proceeds to 704.

At 704, the control module 102 controls the power converter module 110 to output power to the light source 112. In such examples, the power converter module 110 may provide electric power generated by the power generator 104 and/or electric power stored in the power storage module 108. Control then proceeds to 706, where the control module 102 activates the light source 112 according to a defined light sequence based on the received signal, as explained herein. Control then proceeds to 708.

At 708, the control module 102 determines whether another signal is received. For example, the control module 102 may receive a signal indicative of a message relating to a characteristic of the vehicle (e.g., a vehicle maintenance recommendation, a condition of the vehicle, etc.), as explained herein. If no signal is received, control may end as shown in FIG. 7. If, however, a signal is received at 708, control proceeds to 710. At 710, the control module 102 activates the light source 112 according to another defined light sequence based on the received vehicle message signal, as explained herein. Control may then end.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for controlling at least one light source in a wheel of a vehicle, the system comprising:
a wheel including a center cap having a first portion configured to rotate with the wheel and a second portion configured to remain stationary as the wheel rotates, the second portion including at least one light source and a power storage module;
a generator coupled to the power storage module, the generator configured to generate electric power and output the electric power to at least the power storage module;
a power converter coupled between the power storage module and the at least one light source; and
a control module in communication with the power converter, the control module configured to:
receive a first signal indicative of a key associated with the vehicle being within a defined distance;
receive a second signal indicative of a characteristic of the vehicle, the characteristic including at least one of a vehicle maintenance recommendation and a vehicle fault condition; and
in response to receiving the first signal and the second signal, control the power converter to output the electric power generated by the generator and stored in the power storage module to the at least one light source and control the at least one light source to output a defined light sequence based on the second signal to provide a notification to an approaching user of the characteristic of the vehicle.

2. The system of claim 1, wherein:
the defined light sequence is a first defined light sequence;
the control module is configured to, in response to receiving only the first signal, control the at least one light source to output a second defined light sequence based on the received first signal; and
the first defined light sequence and the second defined light sequence are different.

3. The system of claim 1, wherein:
the first portion of the center cap includes a housing and a shaft coupled to the housing; and
the light source and the power storage module are positioned within the housing.

4. The system of claim 3, wherein:
the second portion of the center cap includes an emblem associated with the vehicle; and
the control module is configured to control the light source to illuminate the emblem.

5. The system of claim 4, wherein:
the housing includes a body and a transparent face attached to the body; and
the transparent face is positioned adjacent to the emblem.

6. The system of claim 4, wherein the at least one light source includes one or more LEDs.

7. The system of claim 1, wherein the generator includes at least one magnet coupled to a rotating component of the first portion and at least one coil coupled to a stationary component of the second portion.

8. The system of claim 1, wherein the power storage module includes a battery and/or an ultra-capacitor.

9. The system of claim 1, wherein:
the control module includes a communications module in communication with a virtual key module associated with the vehicle; and
the communications module is configured to receive the first signal via the virtual key module.

10. The system of claim 1, further comprising a switching device coupled to the control module, the switching device controllable to put the center cap of the wheel in a pairing mode for linking to the control module.

11. A method of controlling at least one light source in a wheel of a vehicle, the wheel including a center cap having a first portion configured to rotate with the wheel and a second portion configured to remain stationary as the wheel rotates, the second portion including the light source and a power storage module, the method comprising:
receiving a first signal indicative of a key associated with the vehicle being within a defined distance;
receiving a second signal indicative of a characteristic of the vehicle, the characteristic including at least one of a vehicle maintenance recommendation and a vehicle fault condition; and
in response to receiving the first signal and the second signal, controlling a power converter to output electric power generated by a generator and stored in the power storage module to the light source and controlling the light source to output a defined light sequence based on the second signal to provide a notification to an approaching user of the characteristic of the vehicle.

12. The method of claim 11, wherein:
the defined light sequence is a first defined light sequence;
the method further comprise controlling the light source to output a second defined light sequence based on the received first signal; and
the first defined light sequence and the second defined light sequence are different.

13. The method of claim 12, wherein:
the first portion of the center cap includes a housing and a shaft coupled to the housing; and
the light source and the power storage module are positioned within the housing.

14. The method of claim 13, wherein:
the second portion of the center cap includes an emblem associated with the vehicle; and
controlling the light source to output the defined light sequence includes controlling the light source to illuminate the emblem.

15. The method of claim 14, wherein:
the housing includes a body and a transparent face attached to the body; and
the transparent face is positioned adjacent to the emblem.

16. The method of claim 11, wherein the generator includes at least one magnet coupled to a rotating component of the first portion and at least one coil coupled to a stationary component of the second portion.

17. The method of claim 11, wherein the power storage module includes a battery and/or an ultra-capacitor.

18. The method of claim 11, further comprising controlling a switching device to put the center cap of the wheel in a pairing mode.

19. A system for controlling at least one light source in a wheel of a vehicle, the system comprising:
a wheel including a center cap having a first portion configured to rotate with the wheel and a second portion configured to remain stationary as the wheel rotates, the second portion including at least one light source and a battery;
a generator configured to generate electric power and output the electric power to at least the battery, the generator including at least one magnet coupled to a rotating component of the first portion and at least one coil coupled to a stationary component of the second portion;
a power converter coupled between the battery and the at least one light source; and
a control module configured to:
receive a first signal indicative of a key associated with the vehicle being within a defined distance;
receive a second signal indicative of a characteristic of the vehicle, the characteristic including at least one of a vehicle maintenance recommendation and a vehicle fault condition;
in response to receiving the first signal, control the power converter to provide the electric power generated by the generator and stored in the battery to the at least one light source and control the at least one light source to output a first defined light sequence based on the received first signal; and
in response to receiving the first signal and the second signal, control the at least one light source to output a second defined light sequence based on the received second signal to provide a notification to an approaching user of the characteristic of the vehicle.

20. The system of claim 19, further comprising a switching device coupled to the control module, the switching device controllable to put the center cap of the wheel in a pairing mode for linking to the control module.

* * * * *